United States Patent
Liang et al.

(10) Patent No.: US 11,692,628 B2
(45) Date of Patent: Jul. 4, 2023

(54) SEALING DEVICE FOR GAS-LIQUID TWO-PHASE FLUID MEDIUM UNDER VARIABLE WORKING CONDITIONS

(71) Applicant: CHANGSHU INSTITUTE OF TECHNOLOGY, Changshu (CN)

(72) Inventors: Changping Liang, Suzhou (CN); Qiaoping Yue, Suzhou (CN); Junjun Liu, Suzhou (CN); Feng Yi, Suzhou (CN); Lin Wang, Suzhou (CN)

(73) Assignee: CHANGSHU INSTITUTE OF TECHNOLOGY, Suzhou (CN)

( * ) Notice: Subject to any disclaimer, the term of this patent is extended or adjusted under 35 U.S.C. 154(b) by 77 days.

(21) Appl. No.: 17/486,949

(22) Filed: Sep. 28, 2021

(65) Prior Publication Data

US 2022/0128150 A1 Apr. 28, 2022

Related U.S. Application Data

(63) Continuation of application No. PCT/CN2020/128900, filed on Nov. 16, 2020.

(30) Foreign Application Priority Data

Oct. 26, 2020 (CN) .......................... 202011151755.3

(51) Int. Cl.
 *F16J 15/00* (2006.01)
 *F16J 15/34* (2006.01)
 *F16J 15/447* (2006.01)

(52) U.S. Cl.
 CPC ........... *F16J 15/002* (2013.01); *F16J 15/342* (2013.01); *F16J 15/3424* (2013.01);
 (Continued)

(58) Field of Classification Search
 CPC ...... F16J 15/164; F16J 15/3412; F16J 15/342; F16J 15/3424; F16J 15/3448;
 (Continued)

(56) References Cited

U.S. PATENT DOCUMENTS 6,843,482 B1 * 1/2005 Bayne .................. F16J 15/002
 277/412
9,518,473 B2 * 12/2016 Mateman ............. F16J 15/3464
 (Continued)

FOREIGN PATENT DOCUMENTS

CH 622865 A5 4/1981
CN 2076625 U 5/1991
 (Continued)

*Primary Examiner* — Nicholas L Foster
(74) *Attorney, Agent, or Firm* — Bayramoglu Law Offices LLC

(57) ABSTRACT

A sealing device for a gas-liquid two-phase fluid medium under variable working conditions includes a rotating shaft and a housing, and a chamber formed by the housing is configured to accommodate the gas-liquid two-phase fluid medium. The sealing device further includes a labyrinth sealing mechanism and a fluid dynamic-pressure mechanical sealing mechanism with double end faces, where the labyrinth sealing mechanism and the fluid dynamic-pressure mechanical sealing mechanism with double end faces conduct mutual synergetic effect. Sealing buffer chambers are arranged between the labyrinth sealing mechanism and the fluid dynamic-pressure mechanical sealing mechanism; the fluid dynamic-pressure mechanical sealing mechanism is provided with stationary rings and movable rings, where the stationary rings and the movable rings oppositely abut against with each other.

7 Claims, 3 Drawing Sheets

(52) U.S. Cl.
CPC ......... *F16J 15/447* (2013.01); *F16J 15/4472* (2013.01); *F16J 15/3448* (2013.01); *F16J 15/3452* (2013.01)

(58) Field of Classification Search
CPC .... F16J 15/3452; F16J 15/3464; F16J 15/002; F16J 15/40; F16J 15/447; F16J 15/4472; F16J 15/4474
See application file for complete search history.

(56) References Cited

U.S. PATENT DOCUMENTS

| | | | |
|---|---|---|---|
| 11,248,706 B2* | 2/2022 | Imura | F16C 33/74 |
| 2014/0027985 A1* | 1/2014 | Mateman | F04D 29/122 |
| | | | 277/412 |
| 2014/0030063 A1* | 1/2014 | Mateman | F16J 15/447 |
| | | | 415/110 |
| 2017/0051857 A1 | 2/2017 | Packing | |
| 2022/0349480 A1* | 11/2022 | Zhang | F16J 15/44 |

FOREIGN PATENT DOCUMENTS

| | | |
|---|---|---|
| CN | 101016949 A | 8/2007 |
| CN | 201306445 Y | 9/2009 |
| CN | 101713461 A | 5/2010 |
| CN | 101749431 A | 6/2010 |
| CN | 101975274 A | 2/2011 |
| CN | 201875137 U | 6/2011 |
| CN | 102537353 A | 7/2012 |
| CN | 103470762 A | 12/2013 |
| CN | 103557334 A | 2/2014 |
| CN | 203770202 U | 8/2014 |
| CN | 104154235 A | 11/2014 |
| CN | 104179975 A | 12/2014 |
| CN | 106122482 A | 11/2016 |
| CN | 109185461 A | 1/2019 |
| CN | 110332316 A | 10/2019 |
| CN | 110671501 A | 1/2020 |
| CN | 111335968 A | 6/2020 |
| EP | 0742396 A1 | 11/1996 |
| JP | 2000088112 A | 3/2000 |
| RU | 167896 U1 | 1/2017 |

* cited by examiner

SEALING DEVICE FOR GAS-LIQUID TWO-PHASE FLUID MEDIUM UNDER VARIABLE WORKING CONDITIONS

CROSS REFERENCE TO THE RELATED APPLICATIONS

This application is the Continuation application of International Application No. PCT/CN2020/128900, filed on Nov. 16, 2020, which is based upon and claims priority to Chinese Patent Application No. 202011151755.3, filed on Oct. 26, 2020, the entire contents of which are incorporated herein by reference.

TECHNICAL FIELD

The present invention relates to the technical field of sealing devices, and more particularly, to a sealing device for a gas-liquid two-phase fluid medium under variable working conditions.

BACKGROUND

In the prior art, the fluid medium conveyed in the working chamber of some rotating machinery is a gas-liquid two-phase fluid medium. When the working conditions of the rotating machinery change, the pressure of the gas-liquid two-phase fluid medium will have a large fluctuation. Since the gas is a compressible fluid, the gas will be compressed when the pressure increases, causing its volume proportion to decrease in the medium; when the pressure decreases, the gas will expand, causing its volume proportion to increase in the medium.

For the prior fluid dynamic-pressure mechanical sealing devices, especially the dynamic-pressure mechanical sealing devices of the gas-liquid two-phase fluid medium, there is often a situation of failed sealing caused by the failed opening of end face under the change of working conditions. The failure of sealing is related to phase change of the fluid film between sealing end faces. Due to the large pressure in the working chamber of rotating machinery and the small external pressure, the gas component in medium will expand rapidly at the moment of the change of working conditions, resulting in the flash evaporation of liquid film between sealing end faces. As a result, the opening force increases rapidly, which leads to an instantaneous opening of sealing end faces of movable rings and stationary rings. The instantaneous increase or decrease of the opening force of sealing end faces of the movable rings and the stationary rings caused by the change of working conditions will lead to an instantaneous increase or decrease of the distance between the sealing end faces of the movable rings and the stationary rings. The instantaneous increase or decrease of the opening force of the sealing end faces of the movable rings and the stationary rings will further lead to a radial pulsation of the movable rings and cause the opposite sealing end faces of the movable rings or the stationary rings to incline to be not parallel with each other. The above factors will destroy the stiffness and sealing stability of the fluid film between the sealing end face of the movable rings and the stationary rings, resulting in technical problems such as large leakage, poor stability of sealing, weak adaptability, and insufficient reliability of the gas-liquid two-phase fluid.

SUMMARY

The technical problem to be solved by the present invention is: in order to solve the problem of poor sealing stability and weak adaptability of the gas-liquid two-phase fluid medium when the working conditions change, the present invention provides a sealing device for a gas-liquid two-phase fluid medium under variable working conditions to solve the above problems.

The technical solution adopted by the present invention for solving the technical problems is as follows. A sealing device for a gas-liquid two-phase fluid medium under variable working conditions includes a rotating shaft and a housing. The housing is provided with an opening, and a chamber formed by the housing is configured to accommodate the gas-liquid two-phase fluid medium. The sealing device further includes a labyrinth sealing mechanism and a fluid dynamic-pressure mechanical sealing mechanism with double end faces, where the labyrinth sealing mechanism and the fluid dynamic-pressure mechanical sealing mechanism with double end faces conduct mutual synergetic effect. Sealing buffer chambers are arranged between the labyrinth sealing mechanism and the fluid dynamic-pressure mechanical sealing mechanism with double end faces. The fluid dynamic-pressure mechanical sealing mechanism includes a left stationary ring, a left movable ring, a right stationary ring, and a right movable ring, where the left stationary ring oppositely abuts against the left movable ring, and the right stationary ring oppositely abuts against the right movable ring.

The left stationary ring and the right stationary ring are respectively fixed on a left stationary ring cover and a right stationary ring cover formed by the housing through a left metal sealing ring and a right metal sealing ring, respectively. The left movable ring and the right movable ring are fixed on the rotating shaft through a left sealing ring and a right sealing ring, respectively. The part of each of the sealing end faces of the left movable ring and the right movable ring adjacent to its outer circumference has an inclined angle of 3 to 8 degrees from the radial direction.

A spring is connected between a left pushing ring and a right pushing ring, and the left pushing ring and the right pushing ring oppositely abut against the left movable ring and the right movable ring respectively by elastic force. A left sealing packing is arranged in a chamber between the left pushing ring, the left movable ring, and the rotating shaft, and a right sealing packing is arranged in a chamber between the right pushing ring, the right movable ring, and the rotating shaft. A limiting sleeve is arranged on the outer circumference of the fluid dynamic-pressure mechanical sealing mechanism. An isolation sleeve is arranged between the spring and the rotating shaft.

The labyrinth sealing mechanism includes a plurality of sealing teeth arranged axially. The sealing teeth are ladder-shaped trapezoidal convex teeth, and ladder-shaped trapezoidal grooves formed by the housing cooperate with the sealing teeth to form a zigzag sealing channel of the labyrinth sealing. A plurality of spiral areas formed by micropore groups are arranged on a dynamic-pressure sealing end face of the left stationary ring and the right stationary ring, and each spiral area includes a branch area adjacent to the outer circumference of the left stationary ring and the right stationary ring and deviated along the rotating direction of rotating shaft. The branch area is also formed by the micropore groups. The pore diameters D of the micropore groups in the spiral area and the branch area gradually decrease in the radial direction. The cross-sectional shape of the micropore is one of the trapezoid and the ladder-shaped trapezoid. The pore diameter of the micropore is the diameter of the ring of the cross-section of the micropore at the sealing end face.

Preferably, each of the left stationary ring, the left movable ring, the right stationary ring and the right movable ring is made of silicon carbide materials.

Preferably, the left metal sealing ring and the right metal sealing ring are made of hard alloy materials with good heat dissipation performance and being not liable to be deformed by heat.

Preferably, the portion from micropore groups, being located on the dynamic-pressure sealing end face of the left stationary ring and the right stationary ring and adjacent to the inner circumference of the stationary rings, to the inner circumference of the stationary rings is configured as a sealing dam.

Preferably, the portion between adjacent micropore groups on the dynamic-pressure sealing end face of the left stationary ring and the right stationary ring is configured as a sealing weir.

Preferably, the spring can be replaced by a bellows as an alternative.

Preferably, the inner circumferential surface of the limiting sleeve is provided with a limiting step corresponding to the outer circumferential surface of the movable rings and the outer circumferential surface of the pushing rings.

The labyrinth sealing of the present invention seals the fluid by producing the throttling effect and expansion effect between the shaft and the housing through a zigzag sealing channel produced by the structure of the sealing convex teeth of the labyrinth sealing ring. The labyrinth sealing mainly achieves the throttling effect for liquid sealing because of liquid friction resistance effect, and for gas sealing, it mainly converts kinetic energy into thermal energy according to the contraction and diffusion of thermodynamic effect to achieve the throttling effect. However, the labyrinth sealing will be subjected to the fluctuation of medium pressure under variable working conditions, resulting in a small portion of leakage from sealing, which requires the further sealing.

As the further sealing after the labyrinth sealing, the dynamic-pressure sealing for the gas-liquid two-phase medium forms a pressure film of the gas-liquid two-phase medium between the movable rings and the stationary rings and pumps the liquid medium back towards the medium chamber under the viscous shearing action of the dynamic-pressure groove, so as to further reduce the burden of the labyrinth sealing. This is the synergistic effect of the labyrinth sealing and the dynamic-pressure sealing of the gas-liquid two-phase medium. However, it requires the stability of the pressure because the fluctuation of the pressure of the fluid medium film between the movable rings and the stationary rings causes the expansion or compression of the gas and further results in the unstable stiffness of the pressure film of the gas-liquid two-phase medium as well as the leakage. Therefore, in order to ensure the sealing effect and stability of the dynamic-pressure sealing of the gas-liquid two-phase medium, the throttling effect of the labyrinth sealing in the previous stage is required to reduce the pressure of the gas-liquid two-phase fluid medium. In addition, the dynamic-pressure sealing of the gas-liquid two-phase medium is carried out after the pressure fluctuation caused by the change of working conditions is attenuated in the sealing buffer chamber. In addition, the dynamic-pressure groove in this application is formed by the micropore group.

According to the above technical solutions, the present invention has the following technical effects.

1. In the present invention, the synergistic effect of the labyrinth sealing and the dynamic-pressure sealing of the gas-liquid two-phase medium is utilized. In other words, the zigzag flow channel formed by the structure of the ladder-shaped trapezoidal labyrinth sealing teeth is conducive to the formation of the friction effect of the liquid and the contraction and diffusion of the thermodynamic effect of the gas, thereby realizing good throttling and pressure reduction of the gas-liquid two-phase medium to achieve a good sealing effect. Moreover, the labyrinth sealing reduces the medium pressure under variable working conditions in the medium chamber. On the basis of the reduction of the gas-liquid two-phase medium pressure, the pressure fluctuation of the gas-liquid two-phase medium is attenuated by the sealing buffer chamber, so that the gas-liquid two-phase medium leaked after the labyrinth sealing is less affected by the pressure fluctuation resulted from the change of working conditions when the dynamic-pressure mechanical sealing is carried out, thereby ensuring the sealing stiffness and stability of the gas-liquid two-phase fluid pressure film between the sealing end faces of the movable rings and the sealing end faces of the stationary rings in the dynamic-pressure mechanical sealing mechanism of the gas-liquid two-phase medium.

2. For the dynamic-pressure mechanical sealing stage of the gas-liquid two-phase medium, the gas-liquid two-phase medium leaked after the labyrinth sealing has only a small pressure after being subjected to the throttling effect of the labyrinth sealing, and an inclined angle is formed on the area of the movable ring adjacent to the outer circumference to form a notch, which ensures that in the dynamic-pressure mechanical sealing stage, the sealing end faces between the movable rings and the stationary rings can also rapidly open to form a sealing fluid film in the low speed stage of rotating machinery. A plurality of spiral areas formed by micropore groups are arranged on the dynamic-pressure sealing end face of the stationary rings, and each spiral area includes a branch area adjacent to the outer circumference of the stationary rings and deviated along the rotating direction of rotating shaft. The branch area is also formed by the micropore groups. The pore diameters D of the micropore groups in the spiral area and the branch area gradually decrease in the radial direction, and the cross section of the micropore is one of the trapezoid and the ladder-shaped trapezoid. This design of micropore groups is conducive to the formation of a stable-stiffness pressure film of the gas-liquid two-phase medium between the movable rings and the stationary rings to ensure the stability of the sealing, and is conducive to pump the liquid medium towards the sealing buffer chamber under the viscous shearing action of the dynamic-pressure groove to reduce the burden of the labyrinth sealing.

3. The flow of the medium is conducive to take away the heat between the movable rings and the stationary rings. The selection of the silicon carbide materials for the movable rings and the stationary rings and the selection of the materials of the metal sealing rings are conducive to the rapid heat dissipation of the movable rings and the stationary rings, so as to avoid the deformation and prevent the tilt of the sealing end faces between the two rings caused by the deformation of the movable rings and the stationary rings. The inner circumferential surface of the limiting sleeve is provided with the limiting step corresponding to the outer circumferential surface of the movable rings and the outer circumferential surface of the pushing rings, which can effectively prevent the radial pulsation of the movable rings and the tilt of the sealing end faces between the movable rings and the stationary rings.

BRIEF DESCRIPTION OF THE DRAWINGS

The present invention will be further illustrated combined with the drawings and embodiments below.

In FIGS. 1-5: 1. rotating shaft, 2a. left sealing tooth, 2b. right sealing tooth, 3. housing, 4a. left metal sealing ring, 4b. right metal sealing ring, 5a. left stationary ring, 5b. right stationary ring, 6a. left movable ring, 6b. right movable ring, 7. limiting sleeve, 8. opening, 9a. left pushing ring, 9b. right pushing ring, 10a. left sealing packing, 10b. right sealing packing, 11a. left sealing ring, 11b. right sealing ring, 12. spring, 13. insolation cover, 14a. left sealing buffer chamber, 14b. right sealing buffer chamber, Y. inclined angle, 5-1. sealing weir, 5-2. sealing dam, 5-3. spiral area, 5-4. branch area.

DETAILED DESCRIPTION OF THE EMBODIMENTS

Figure 1:
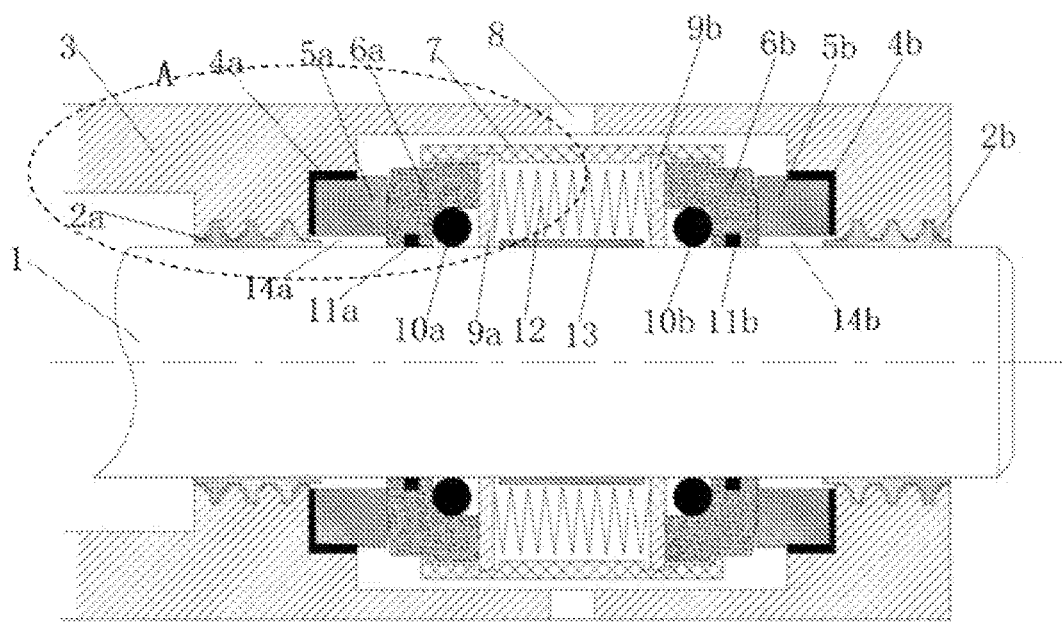
FIG. 1 is a structural diagram of the sealing device for a gas-liquid two-phase fluid medium under variable working conditions.

Embodiments of the present invention are described in detail below, and examples of the embodiments are indicated in the drawings, wherein the same or similar labels throughout represent the same or similar components or the components with the same or similar functions. The embodiments described below by referring the drawings are exemplary and are only used to explain the present invention and cannot be understood as limitations to the present invention.

In the description of the present invention, it should be noted that the orientation or position relationships indicated by the terminologies such as "center", "longitudinal", "transverse", "length", "width", "thickness", "upper", "lower", "front", "back", "left", "right", "vertical", "horizontal", "top", "bottom", "inner", "outer", "axial", "radial", "circumferential" and others are based on the orientation or position relationship indicated in the drawings. It is only for the purpose of describing the present invention and simplifying the description, rather than indicating or implying that the referred device or component to must have a specific orientation, or be conducted and operated in a specific orientation, and therefore cannot be understood as a limitation to the present invention.

In addition, the terminologies of "first", "second", etc. are only used for descriptive purposes and cannot be understood to indicate or imply relative importance. In the description of the present invention, it should be noted that unless otherwise specific stipulation and definition, the terminologies "connected to" and "connection" should be understood in a broad sense, for example, it can be a fixed connection, a detachable connection, or an integrated connection; it can be a mechanical connection or an electrical connection; it can be a direct connection or an indirect connection through an intermediate medium. For those skilled in the art, the specific meaning of the above terminologies in the present invention can be understood according to specific conditions. Additionally, in the description of the present invention, unless otherwise stated, "a plurality of" means two or more.

Figure 2:
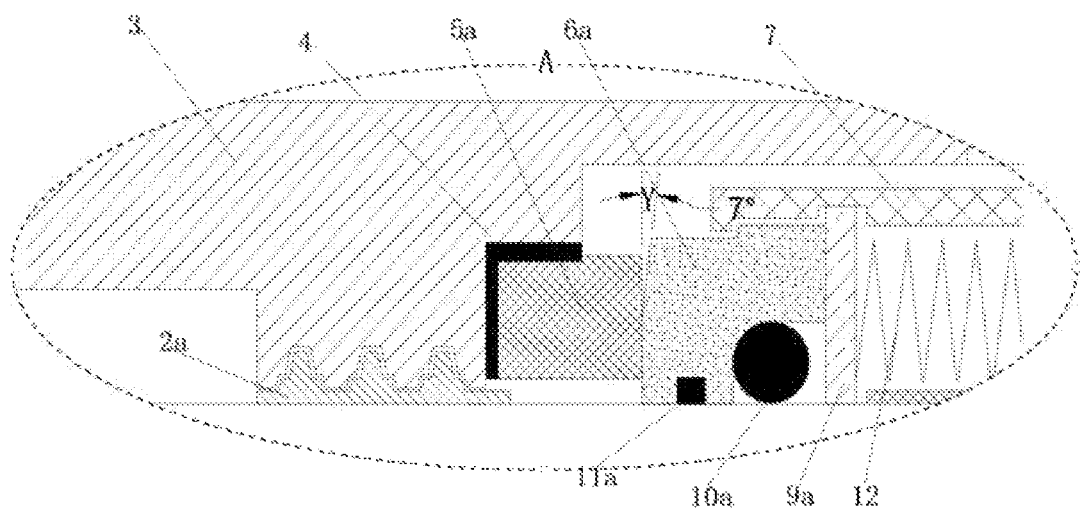
FIG. 2 is an enlarged view of the area A in FIG. 1, namely, the structural diagram showing the labyrinth sealing mechanism and the fluid dynamic-pressure mechanical sealing mechanism with double end faces according to the sealing device for the gas-liquid two-phase fluid medium under the variable working conditions.
Figure 3:
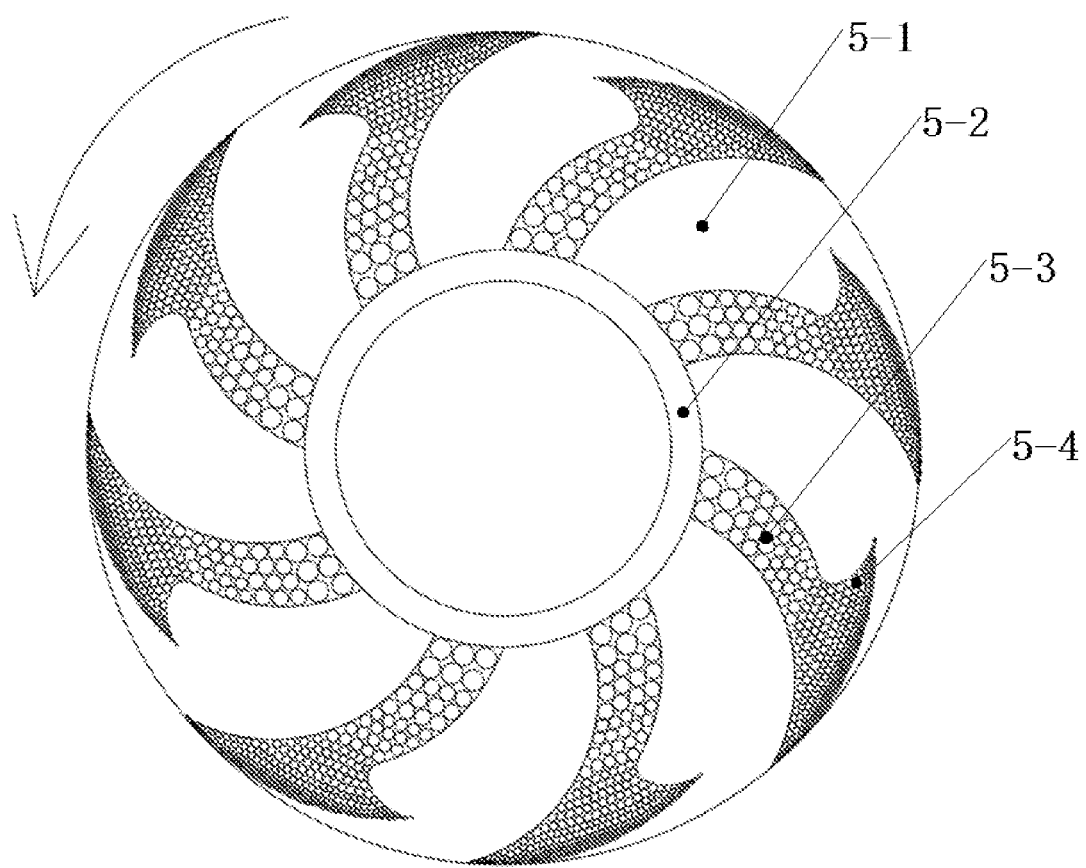
FIG. 3 is a structural diagram showing the micropore groups on the sealing end faces of the left and right stationary rings according to the sealing device for the gas-liquid two-phase fluid medium under the variable working conditions.
Figure 4:
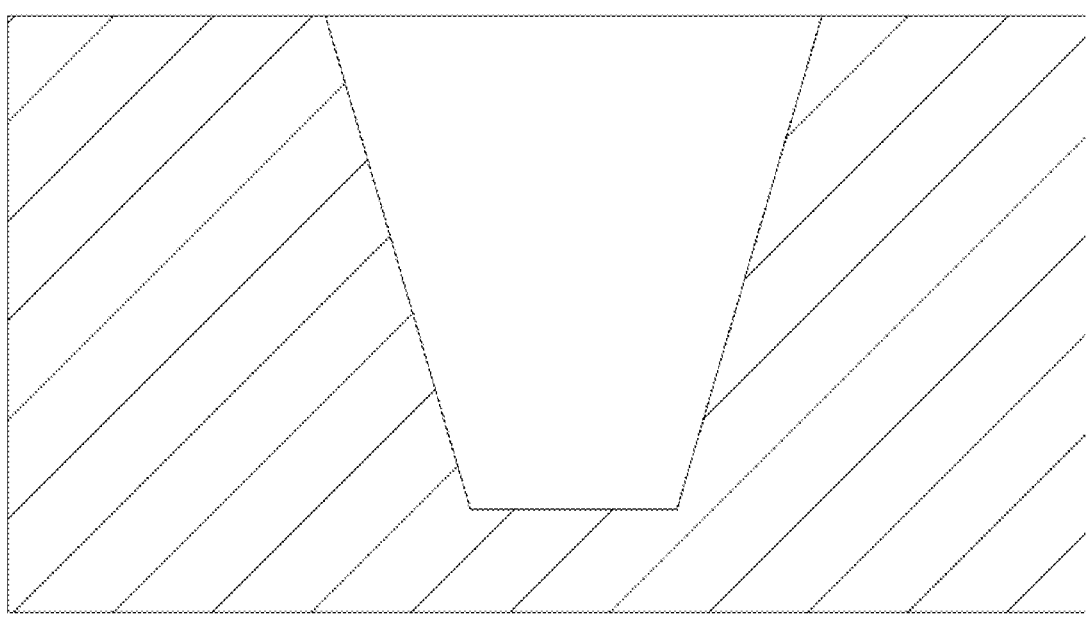
FIG. 4 is a cross-section view of the trapezoid of the micropore in the radial direction of the rotating shaft according to the sealing device for the gas-liquid two-phase fluid medium under the variable working conditions.
Figure 5:
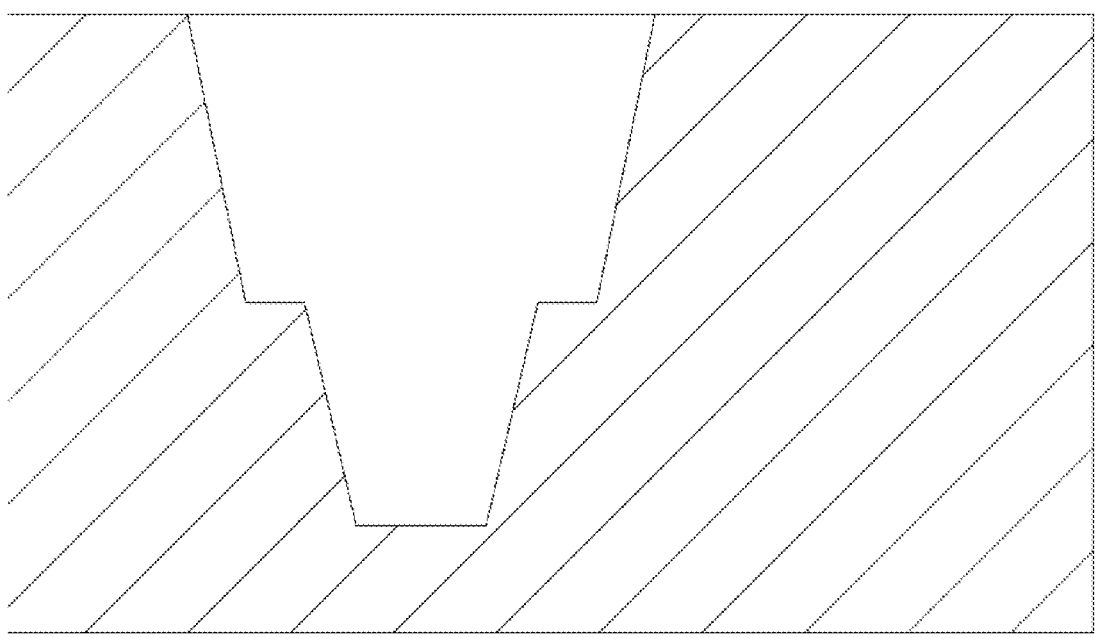
FIG. 5 is a cross-section view of the ladder-shaped trapezoid of the micropore in the radial direction of the rotating shaft according to the sealing device for the gas-liquid two-phase fluid medium under the variable working conditions.

As shown in FIGS. 1 to 5, the present invention provides a sealing device for a gas-liquid two-phase fluid medium under variable working conditions, which includes the rotating shaft 1 and the housing 3. The housing 3 is provided with the opening 8. The chamber formed by the housing 3 is configured to accommodate the gas-liquid two-phase fluid medium. The sealing device further includes a labyrinth sealing mechanism and a fluid dynamic-pressure mechanical sealing mechanism with double end faces, where the labyrinth sealing mechanism and the fluid dynamic-pressure mechanical sealing mechanism with double end faces conduct mutual synergetic effect. The left sealing buffer chamber 14a and the right sealing buffer chamber 14b are arranged between the labyrinth sealing mechanism and the fluid dynamic-pressure mechanical sealing mechanism with double end faces.

The fluid dynamic-pressure mechanical sealing mechanism includes the left stationary ring 5a, the left movable ring 6a, the right stationary ring 5b and the right movable ring 6b, where the left stationary ring 5a and the left movable ring 6a oppositely abut against with each other, and the right stationary ring 5b and the right movable ring 6b oppositely abut against with each other. The left stationary ring 5a and the right stationary ring 5b are respectively fixed on the left stationary ring cover and the right stationary ring cover formed by the housing 3 through the left metal sealing ring 4a and the right metal sealing ring 4b, respectively. The left movable ring 6a and the right movable ring 6b are fixed on the rotating shaft 1 through the left sealing ring 11a and the right sealing ring 11b, respectively. The spring 12 is connected between the left pushing ring 9a and the right pushing ring 9b, and the left pushing ring 9a and the right pushing ring 9b oppositely abut against the left movable ring 6a and the right movable ring 6b, respectively. The part of each of the sealing end faces of the left movable ring 6a and the right movable ring 6b adjacent to its outer circumference has the inclined angle of 3 to 8 degrees from the radial direction, and the inclined angle is set to 7 degrees in this embodiment. Specifically, the spring 12 can be replaced by a bellows as an alternative.

The left sealing packing 10a is arranged in the chamber between the left pushing ring 9a, the left movable ring 6a and the rotating shaft 1, and the right sealing packing 10b is arranged in the chamber between the right pushing ring 9b, the right movable ring 6b and the rotating shaft 1. The limiting sleeve 7 is arranged on the outer circumference of the fluid dynamic-pressure mechanical sealing mechanism, and the isolation sleeve 13 is arranged between the spring 12 and the rotating shaft 1.

The labyrinth sealing mechanism includes a plurality of sealing teeth (2a, 2b) arranged axially, and the sealing teeth (2a, 2b) are ladder-shaped trapezoidal convex teeth. The ladder-shaped trapezoidal grooves formed by the housing 3 cooperate with the sealing teeth (2a, 2b) to form a zigzag sealing channel of the labyrinth sealing.

A plurality of spiral areas 5-3 formed by micropore groups are arranged on the dynamic-pressure sealing end face of the left stationary ring 5a and the right stationary ring 5b, and each spiral area includes the branch area 5-4 adjacent to the outer circumference of the left stationary ring 5a and the right stationary ring 5b and deviated along the rotating direction of the rotation shaft 1. The branch area 5-4 is also formed by the micropore groups. The pore diameters D of the micropore groups of the spiral area 5-3 and the branch area 5-4 gradually decrease in the radial direction, and the cross-sectional shape of the micropore is one of the trapezoid and the ladder-shaped trapezoid.

Each of the left stationary ring 5a, the right stationary 5b, the left movable ring 6a and the right movable ring 6b is made of silicon carbide materials. The left metal sealing ring 4a and the right metal sealing ring 4b are made of hard alloy materials with good heat dissipation performance and being not liable to be deformed by heat.

The portion from micropore groups, being located on the dynamic-pressure sealing end face of the left stationary ring 5a and the right stationary ring 5b and adjacent to the inner circumference of the stationary rings, to the inner circumference of the stationary rings is configured as a sealing dam. The portion between the adjacent micropore groups on the dynamic-pressure sealing end face of the left stationary ring 5a and the right stationary ring 5b is configured as the sealing weir 5-1.

The inner circumferential surface of the limiting sleeve 7 is provided with the limiting step corresponding to the outer circumferential surface of the movable rings 6a and 6b and the outer circumferential surface of the pushing rings 9a and 9b.

The labyrinth sealing mechanism of the present invention seals the fluid by producing the throttling effect and expansion effect between the shaft and the housing 3 through the zigzag sealing channel produced by the structure of the sealing convex teeth of the labyrinth sealing rings. The zigzag sealing channel mainly achieves the throttling effect for liquid sealing because of liquid friction resistance effect, and for gas sealing, it mainly converts kinetic energy into thermal energy according to the contraction and diffusion of thermodynamic effect to achieve the throttling effect. However, the labyrinth sealing mechanism will be subjected to the fluctuation of medium pressure under variable working conditions, resulting in a small portion of leakage from sealing, which requires the further sealing.

The fluid dynamic-pressure mechanical sealing mechanism is the further sealing on the next stage after the labyrinth sealing, which forms a pressure film of the gas-liquid two-phase medium between the movable rings and the stationary rings, and pumps the liquid medium back towards the medium chamber under the viscous shearing action of the dynamic-pressure groove, so as to further reduce the burden of the labyrinth sealing. This is the synergetic effect of the labyrinth sealing mechanism and the fluid dynamic-pressure mechanical sealing mechanism. However, it requires the stability of the pressure because the fluctuation of the pressure of the fluid medium film between the movable rings and the stationary rings causes the expansion or compression of the gas and further results in the unstable stiffness of the pressure film of the gas-liquid two-phase medium as well as the leakage. Therefore, in order to ensure the sealing effect and stability of the dynamic-pressure sealing of the gas-liquid two-phase medium, the throttling effect of the labyrinth sealing in the previous stage is required to reduce the pressure of the gas-liquid two-phase fluid medium. In addition, the dynamic-pressure sealing of the gas-liquid two-phase medium is carried out after the pressure fluctuation caused by the change of working conditions is attenuated in the sealing buffer chamber.

In the technical solution of the present embodiment, the synergistic effect of the labyrinth sealing mechanism and the fluid dynamic-pressure mechanical sealing mechanism is utilized. In other words, the zigzag flow channel formed by the structure of the ladder-shaped trapezoidal labyrinth sealing teeth is conducive to the formation of the friction effect of the liquid and the contraction and diffusion of the thermodynamic effect of the gas, thereby realizing good throttling and pressure reduction of the gas-liquid two-phase medium to achieve a good sealing effect. Moreover, the labyrinth sealing reduces the medium pressure under variable working conditions in the medium chamber. On the basis of the reduction of the gas-liquid two-phase medium pressure, the pressure fluctuation of the gas-liquid two-phase medium is attenuated by the sealing buffer chamber, so that the gas-liquid two-phase medium leaked after the labyrinth sealing is less affected by the pressure fluctuation resulted from the change of working conditions when the dynamic-pressure mechanical sealing is carried out, thereby ensuring the sealing stiffness and stability of the gas-liquid two-phase fluid pressure film between the sealing end faces of the movable rings and the sealing end faces of the stationary rings in the dynamic-pressure mechanical sealing mechanism of the gas-liquid two-phase medium.

The technical solution of the present embodiment, in the dynamic-pressure mechanical sealing stage of the gas-liquid two-phase medium, the gas-liquid two-phase medium leaked after the labyrinth sealing has only a small pressure after being subjected to the throttling effect of the labyrinth sealing, and an inclined angle is formed on the area of the movable ring adjacent to the outer circumference to form a notch, which ensures that in the dynamic-pressure mechanical sealing stage, the sealing end faces between the movable rings and the stationary rings can also rapidly open to form a sealing fluid film in the low speed stage of rotating machinery. A plurality of spiral areas formed by micropore groups are arranged on the dynamic-pressure sealing end face of the stationary rings, and each spiral area includes a branch area adjacent to the outer circumference of the stationary rings and deviated along the rotating direction of rotating shaft. The branch area is also formed by the micropore groups. The pore diameters D of the micropore groups in the spiral area and the branch area gradually decrease in the radial direction, and the cross section of the micropore is one of the trapezoid and the ladder-shaped trapezoid. This design of micropore groups is conducive to the formation of a stable-stiffness pressure film of the gas-liquid two-phase medium between the movable rings and the stationary rings to ensure the stability of the sealing, and is conducive to pump the liquid medium towards the sealing buffer chamber under the viscous shearing action of the dynamic-pressure groove to reduce the burden of the labyrinth sealing.

In the technical solution of the present embodiment, the flow of the medium is conducive to take away the heat between the movable rings and the stationary rings. The selection of the silicon carbide materials for the movable rings and the stationary rings and the selection of the materials of the metal sealing rings are conducive to the rapid heat dissipation of the movable rings and the stationary rings, so as to avoid the deformation and prevent the tilt of the sealing end faces between the two rings caused by the deformation of the movable rings and the stationary rings. The inner circumferential surface of the limiting sleeve is provided with the limiting step corresponding to the outer circumferential surface of the movable rings and the outer circumferential surface of the pushing rings, which can effectively prevent the radial pulsation of the movable rings and the tilt of the sealing end faces between the movable rings and the stationary rings.

In the description of this specification, the description of the reference terminologies "an/one embodiment", "some embodiments", "examples", "specific examples", or "some examples" signifies that the specific features, structures, materials, or features described in combination with the embodiment or the example are included in at least one embodiment or example of the present invention. In this specification, the schematic representation of the terminologies does not necessarily refer to the same embodiment or example. Furthermore, the described specific features, structures, materials, or features may be combined in any one or more embodiments or examples in an appropriate method.

Taking the above ideal embodiment according to the present invention as inspiration, through the above explanation content, those skilled in the art may made various changes and modifications without departing from the scope of the technical idea of the present invention. The technical scope of the present invention is not limited to the content of the specification, but must be determined according to the scope of the claims.

What is claimed is:

1. A sealing device for a gas-liquid two-phase fluid medium under variable working conditions, comprising a rotating shaft and a housing; wherein a chamber formed by the housing is configured to accommodate the gas-liquid two-phase fluid medium;
    the sealing device further comprises a labyrinth sealing mechanism and a fluid dynamic-pressure mechanical sealing mechanism, wherein
        the labyrinth sealing mechanism and the fluid dynamic-pressure mechanical sealing mechanism have a mutually synergetic effect;
        sealing buffer chambers are arranged between the labyrinth sealing mechanism and the fluid dynamic-pressure mechanical sealing mechanism with double end faces;
        the fluid dynamic-pressure mechanical sealing mechanism comprises stationary rings and movable rings, wherein:
            each of the stationary rings oppositely abut against one of the movable rings;
            the stationary rings are respectively fixed on stationary ring covers formed by the housing through metal sealing rings, respectively;
            the movable rings are fixed on the rotating shaft through sealing rings, respectively;
            a spring is fixedly connected to pushing rings, and each of the pushing rings oppositely abut against one of the movable rings;
            sealing packings are arranged in chambers between the pushing rings, the movable rings and the rotating shaft;
            a limiting sleeve is arranged on an outer circumference of the fluid dynamic-pressure mechanical sealing mechanism; and
            an isolation sleeve is arranged between the spring and the rotating shaft;
        the labyrinth sealing mechanism comprises a plurality of sealing teeth arranged axially, wherein the plurality of sealing teeth are ladder-shaped trapezoidal convex teeth, and ladder-shaped trapezoidal grooves formed by the housing cooperate with the plurality of sealing teeth to form a zigzag sealing channel of the labyrinth sealing mechanism;
        a plurality of spiral areas formed by micropore groups are arranged on dynamic-pressure sealing end faces of the stationary rings, each spiral area comprises branch areas adjacent to outer circumferences of the stationary rings and deviated along a rotating direction of the rotating shaft, and the branch areas are formed by the micropore groups;
        pore diameters of the micropore groups in the plurality of spiral areas and pore diameters of the micropore groups in the branch areas gradually decrease in a radial direction, and a cross section of a micropore of the micropore groups is one of a trapezoid and a ladder-shaped trapezoid; and
        a part of sealing end faces of the movable rings adjacent to outer circumferences of the movable rings have an inclined angle of 3 to 8 degrees from the radial direction.

2. The sealing device for the gas-liquid two-phase fluid medium under the variable working conditions according to claim 1, wherein each of the stationary rings and each of the movable rings are made of silicon carbide materials.

3. The sealing device for the gas-liquid two-phase fluid medium under the variable working conditions according to claim 1, wherein the metal sealing rings are made of hard alloy materials.

4. The sealing device for the gas-liquid two-phase fluid medium under the variable working conditions according to claim 1, wherein a portion from the micropore groups, being located on the dynamic-pressure sealing end face of each of the stationary rings and adjacent to an inner circumference of each of the stationary rings, to the inner circumference of each of the stationary rings is configured as a sealing dam.

5. The sealing device for the gas-liquid two-phase fluid medium under the variable working conditions according to claim 1, wherein a portion between adjacent micropore groups on the dynamic-pressure sealing end face of each of the stationary rings is configured as a sealing weir.

6. The sealing device for the gas-liquid two-phase fluid medium under the variable working conditions according to claim 1, wherein the spring is replaced by a bellows.

7. The sealing device for the gas-liquid two-phase fluid medium under the variable working conditions according to claim 1, wherein an inner circumferential surface of the limiting sleeve is provided with a limiting step corresponding to an outer circumferential surface of each of the movable rings and an outer circumferential surface of each of the pushing rings.

* * * * *